(12) United States Patent
Sukegawa et al.

(10) Patent No.: US 7,864,027 B2
(45) Date of Patent: Jan. 4, 2011

(54) ELECTRONIC TAG SYSTEM, COMMUNICATION APPARATUS, AND ELECTRONIC TAG

(75) Inventors: Katsuhiko Sukegawa, Tama (JP); Youichi Kimura, Tama (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 330 days.

(21) Appl. No.: 11/646,226

(22) Filed: Dec. 27, 2006

(65) Prior Publication Data

US 2007/0200678 A1   Aug. 30, 2007

(30) Foreign Application Priority Data

Feb. 15, 2006   (JP) .............................. 2006-038661

(51) Int. Cl.
  *H04Q 5/22* (2006.01)
  *G08B 13/14* (2006.01)
(52) U.S. Cl. ................. 340/10.32; 340/10.1; 340/572.1
(58) Field of Classification Search ... 340/572.1–572.9, 340/10.1, 518, 505, 10.32
See application file for complete search history.

(56) References Cited

U.S. PATENT DOCUMENTS

| | | | | |
|---|---|---|---|---|
| 5,797,132 | A * | 8/1998 | Altwasser ..................... | 705/16 |
| 6,362,737 | B1 * | 3/2002 | Rodgers et al. .......... | 340/572.1 |
| 6,377,203 | B1 * | 4/2002 | Doany .......................... | 342/44 |
| 7,098,793 | B2 * | 8/2006 | Chung ..................... | 340/572.1 |
| 7,307,533 | B2 * | 12/2007 | Ishii ........................ | 340/572.1 |
| 2002/0109603 | A1 | 8/2002 | Otto | |
| 2003/0001009 | A1 | 1/2003 | Collins | |
| 2005/0258956 | A1 | 11/2005 | Neuwirth | |

FOREIGN PATENT DOCUMENTS

| | | |
|---|---|---|
| EP | 0 710 916 A1 | 5/1996 |
| EP | 1 443 469 A1 | 8/2004 |
| GB | 2 410 867 | 8/2005 |
| JP | 09-138892 | 5/1997 |
| JP | 2002-109177 | 4/2002 |
| JP | 2002-304673 | 10/2002 |

(Continued)

OTHER PUBLICATIONS

Shih, Dong-Her, et al. "Taxonomy and survey of RFID anti-collision protocols." *Computer Communications*, vol. 29, No. 11 (2006), pp. 2150-2166.

(Continued)

*Primary Examiner*—Daniel Wu
*Assistant Examiner*—Mark Rushing
(74) *Attorney, Agent, or Firm*—Ladas & Parry LLP

(57) ABSTRACT

A disclosed system includes electronic tags and a communication apparatus that communicates with the electronic tags and includes management information to manage the electronic tags. In the disclosed system, each of the electronic tags contains an ID a part of which represents one of group IDs identifying groups among the electronic tags and is configured to send a response when a request sent from the communication apparatus contains a corresponding one of the group IDs; and the communication apparatus is configured to send requests one by one each of which requests contains one of the group IDs, thereby to request the electronic tags group by group to send responses to the communication apparatus, and to recreate the management information based on the responses.

3 Claims, 12 Drawing Sheets

FOREIGN PATENT DOCUMENTS

| | | |
|---|---|---|
| JP | 2004-265196 | 9/2004 |
| JP | 2005-099888 | 4/2005 |

OTHER PUBLICATIONS 13.56 MHz ISM Band Class 1 Radio Frequency Identification Tag Interface Specification: Candidate Recommendation, Version 1.0.0. Technical Report [online], Feb. 1, 2003 [retrieved on Apr. 17, 2007]. Retrieved from the Internet: < URL: http://www.epcglobalinc.org/standards/specs/>.

Patent Abstracts of Japan of JP 2005-099888 dated Apr. 14, 2005.
Patent Abstracts of Japan of JP 2002-304673 dated Oct. 18, 2002.
Patent Abstracts of Japan of JP 2002-109177 dated Apr. 12, 2002.
Patent Abstracts of Japan of JP 09-138892 dated May 27, 1997.
Patent Abstracts of Japan of JP 2004-265196 dated Sep. 24, 2004.
English Abstract for 0 710 916 A1.
English Abstract for 1 443 469 A1.

* cited by examiner

| UID | SID | GTIN | APID | MID | VID | BATTERY VOLTAGE | NUMBER OF COMMUNICATION SESSIONS | NUMBER OF COMMUNICATION FAILURES | NUMBER OF COMMUNICATION RETRIES | NUMBER OF CONSECUTIVE COMMUNICATION FAILURES | LAST COMMUNICATION TIME | LAST COMMUNICATION STATUS |
|---|---|---|---|---|---|---|---|---|---|---|---|---|
| UID1 | SID1 | C1 | APID1 | MID1 | VID1 | V1 | T1 | E11 | R11 | E21 | t1 | S1 |
| .. | .. | .. | .. | .. | .. | .. | .. | .. | .. | .. | .. | .. |
| UIDn | SIDn | Cn | APIDn | MIDn | VIDn | Vn | Tn | E1n | R1n | E2n | tn | Sn |

ELECTRONIC TAG SYSTEM, COMMUNICATION APPARATUS, AND ELECTRONIC TAG

BACKGROUND OF THE INVENTION

1. Field of the Invention

The present invention generally relates to an electronic tag system, a communication apparatus, and an electronic tag, and more particularly relates to an electronic tag system including electronic tags and a communication apparatus for communicating with and managing the electronic tags, a communication apparatus, and an electronic tag.

2. Description of the Related Art

In an electronic tag system, for example, an electronic tag is registered in a host computer and is then attached to a store shelf. The information displayed on the electronic tag is rewritable from the host computer. The host computer accesses the electronic tag via an access point and rewrites the information displayed on the electronic tag (patent documents 1 through 5).

More specifically, the identification information prerecorded in the electronic tag is registered in an electronic tag management database in the host computer by using a device called an initializer. The host computer accesses the electronic tag via an access point based on the registered identification information and rewrites the information displayed on the electronic tag.

When the electronic tag is detached, the identification information in the electronic tag is read out by using the initializer and the corresponding information (electronic tag information), which includes the identification information, in the electronic tag management database is deleted.

[Patent document 1] Japanese Patent Application Publication No. 2002-304673

[Patent document 2] Japanese Patent Application Publication No. 2005-99888

[Patent document 3] Japanese Patent Application Publication No. 2002-109177

[Patent document 4] Japanese Patent Application Publication No. 2004-265196

[Patent document 5] Japanese Patent Application Publication No. 9-138892

In a conventional electronic tag system, if an electronic tag management database of electronic tags in a host computer is lost because of, for example, power failure, electronic tag information of the electronic tags must be re-registered by reading the electronic tag information from the electronic tags with an initializer.

SUMMARY OF THE INVENTION

The present invention provides an electronic tag system, a communication apparatus, and an electronic tag that substantially obviate one or more problems caused by the limitations and disadvantages of the related art.

Embodiments of the present invention provide an electronic tag system, a communication apparatus, and an electronic tag that make it possible to automatically recreate information for managing electronic tags.

An embodiment of the present invention provides a system including electronic tags and a communication apparatus that communicates with the electronic tags and includes management information to manage the electronic tags, wherein each of the electronic tags contains an ID a part of which represents one of group IDs identifying groups among the electronic tags and is configured to send a response when a request sent from the communication apparatus contains a corresponding one of the group IDs; and the communication apparatus is configured to send requests one by one each of which requests contains one of the group IDs, thereby to request the electronic tags group by group to send responses to the communication apparatus, and to recreate the management information based on the responses.

According to another embodiment of the present invention, a communication apparatus for managing electronic tags each having an ID a part of which represents one of group IDs identifying groups among the electronic tags includes a communication unit configured to communicate with the electronic tags; a management database containing management information to manage the electronic tags; and a processing unit configured to send requests one by one each of which requests contains one of the group IDs, thereby to request the electronic tags group by group to send responses to the communication apparatus, and to recreate the management information based on the responses.

According to still another embodiment of the present invention an electronic tag includes a communication unit configured to communicate with a communication apparatus; and a processing unit configured to send a response to the communication apparatus when a group ID in a request sent from the communication apparatus matches a group ID of the electronic tag which group ID is represented by a part of an ID assigned to the electronic tag.

BRIEF DESCRIPTION OF THE DRAWINGS

FIG. 4 is a table showing an exemplary structure of electronic tag information 131;

DESCRIPTION OF THE PREFERRED EMBODIMENTS

Preferred embodiments of the present invention are described below with reference to the accompanying drawings.

[System Configuration]

Figure 1:
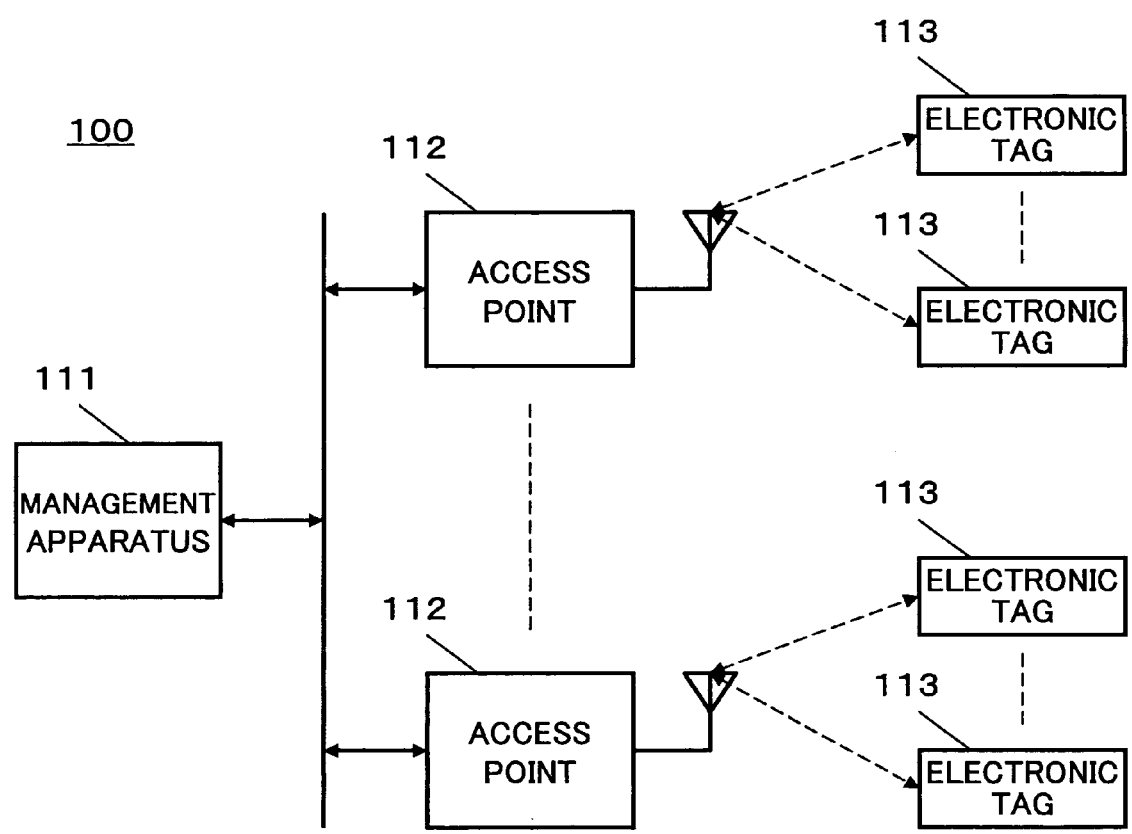
FIG. 1 is a block diagram illustrating an exemplary configuration of an electronic tag system 100 according to an embodiment of the present invention.

FIG. 1 is a block diagram illustrating an exemplary configuration of an electronic tag system 100 according to an embodiment of the present invention.

The electronic tag system 100 includes a management apparatus 111, access points 112, and electronic tags 113. The management apparatus 111 manages the electronic tags 113 that are to be attached to, for example, store shelves, and the access points 112 link the management apparatus 111 and the electronic tags 113.

[Management System 111]

Figure 2:
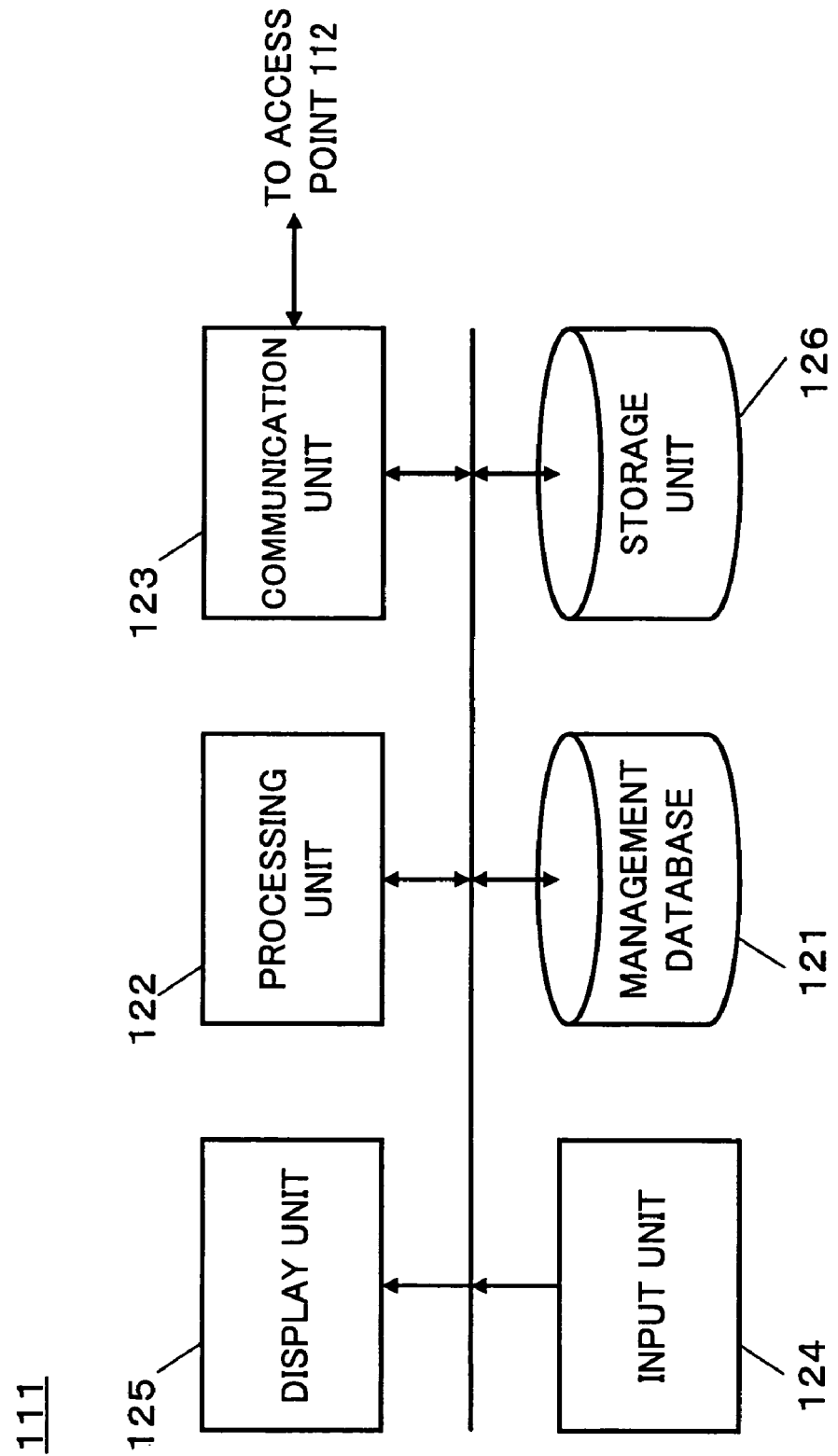
FIG. 2 is a block diagram illustrating an exemplary configuration of a management apparatus 111.

FIG. 2 is a block diagram illustrating an exemplary configuration of the management apparatus 111.

The management apparatus 111 is, for example, implemented by a computer system and includes a management database 121, a processing unit 122, a communication unit 123, an input unit 124, a display unit 125, and a storage unit 126.

The management database 121 contains information on the electronic tags 113.

The processing unit 122 is, for example, implemented by a CPU and performs processing for managing the electronic tags 113 according to a program installed in the storage unit 126.

The communication unit 123 is connected via a network such as a LAN, a WAN, or a leased line to the access points 112 and configured to communicate with the access points 112.

The input unit 124 includes, for example, a mouse and a keyboard, and is used to input commands and data.

The display apparatus 125 is implemented, for example, by an LCD or a CRT and displays, for example, information in the management database 121.

The storage unit 126 is, for example, implemented by a hard disk drive and stores, for example, a program to be executed by the processing unit 122.

Figure 3:
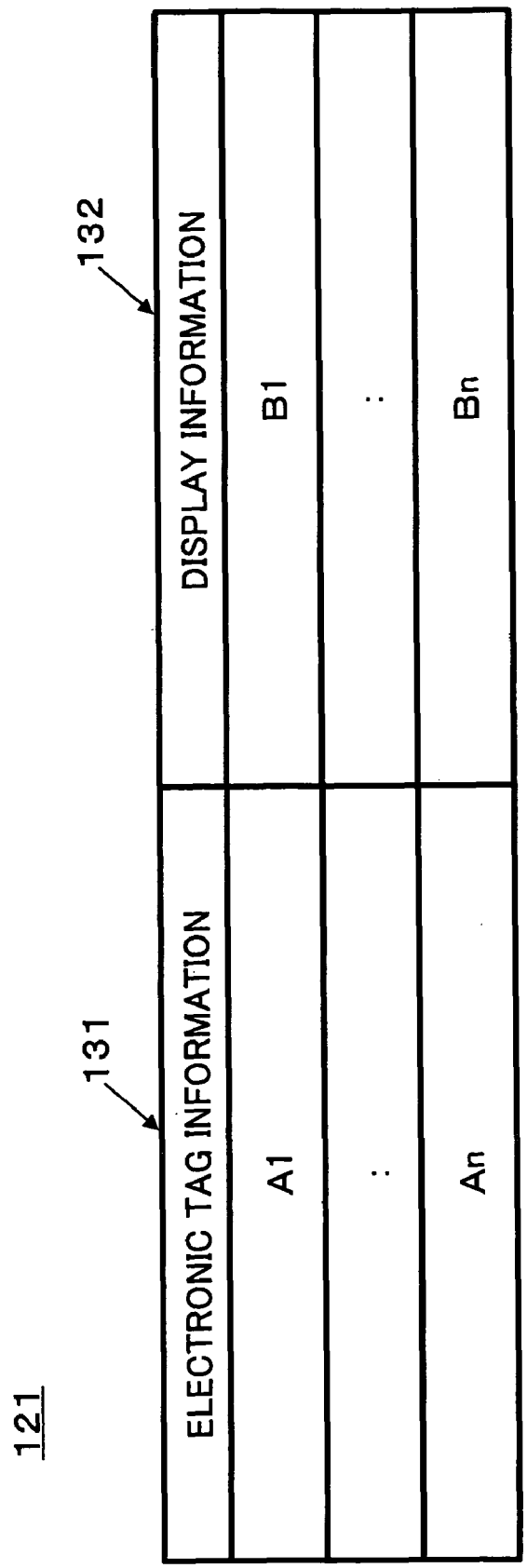
FIG. 3 is a table showing an exemplary structure of a management database 121.

FIG. 3 is a table showing an exemplary structure of the management database 121.

A record in the management database 121 includes electronic tag information 131 and display information 132.

The electronic tag information 131 is used to identify and manage the electronic tag 113 and includes, for example, IDs, a product code, and other information.

The display information 132 includes information such as a product name and its price to be displayed on the electronic tag 113 and can be set by the management apparatus 111.

FIG. 4 is a table showing an exemplary structure of the electronic tag information 131.

The electronic tag information 131 includes fields such as UID, SID, GTIN, APID, MID (model ID), VID (version ID), battery voltage, number of communication sessions, number of communication failures, number of communication retries, number of consecutive communication failures, last communication time, and last communication status.

The UID is a unique ID assigned to each of the electronic tags 113 during production. The SID is an ID used for communication and assigned by the management apparatus 111 to each of the electronic tags 113. The SID has an 18 bit length.

The GTIN is a product code (global trade item number). The APID is an ID for identifying each of the access points 112.

The MID is an ID indicating the model of the electronic tag 113. The VID is an ID indicating the firmware version of the electronic tag 113. The battery voltage indicates the voltage of a battery in the electronic tag 113.

The number of communication sessions indicates the number of communication sessions made between the electronic tag 113 and the access point 112. The number of communication failures indicates the number of failed communication attempts between the electronic tag 113 and the access point 112.

The number of communication retries indicates the number of retried attempts to establish communication between the electronic tag 113 and the access point 112. The number of consecutive communication failures indicates the number of consecutively failed communication attempts between the electronic tag 113 and the access point 112.

The last communication time indicates the time when the electronic tag 113 and the access point 112 communicated most recently. The last communication status indicates the status of the most recent communication between the electronic tag 113 and the access point 112.

The management apparatus 111 manages the electronic tags 113 based on the electronic tag information 131 described above.

[Access Point 112]

Figure 5:
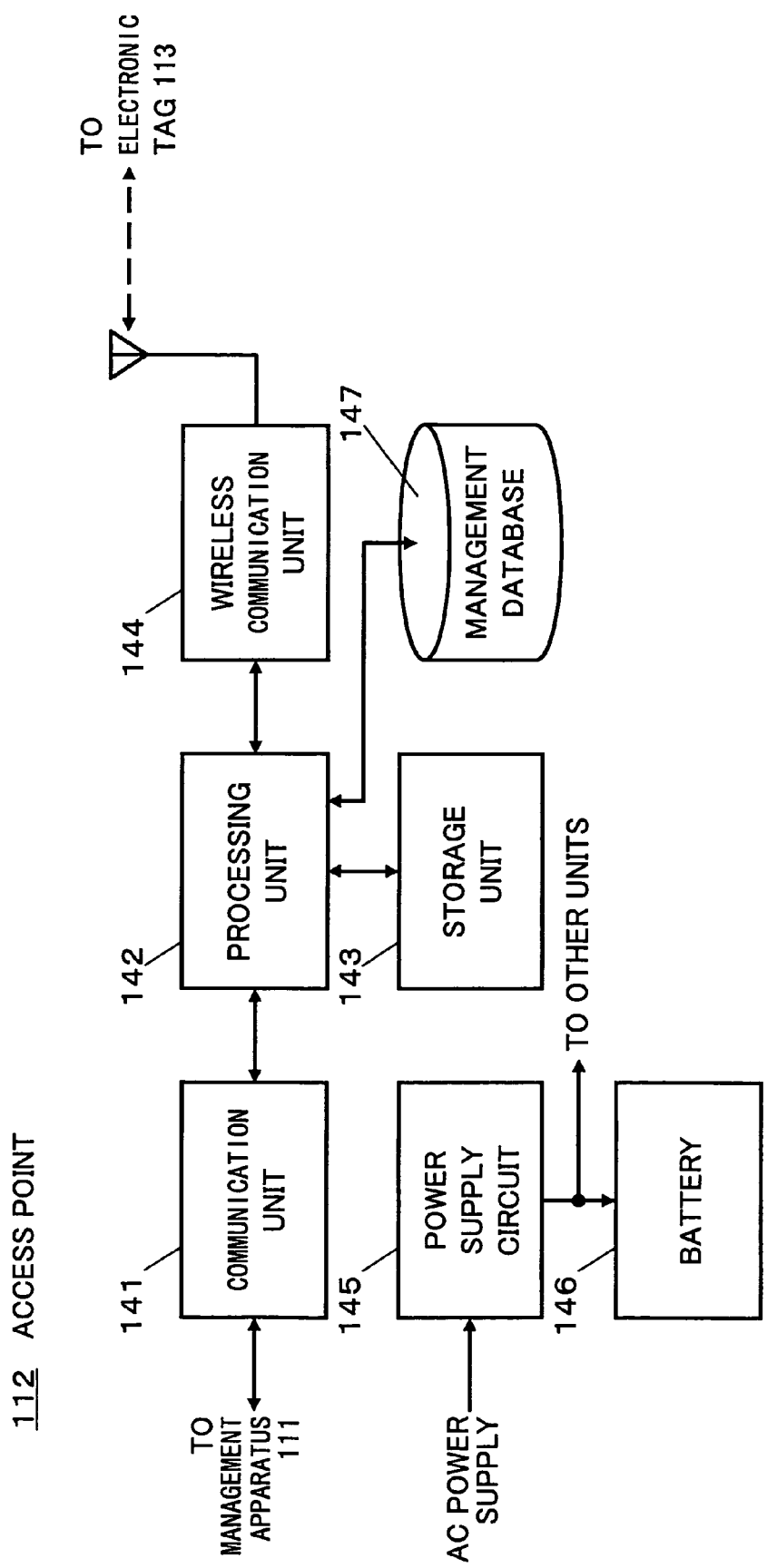
FIG. 5 is a block diagram illustrating an exemplary configuration of an access point 112.

FIG. 5 is a block diagram illustrating an exemplary configuration of the access point 112.

The access point 112 includes a communication unit 141, a processing unit 142, a storage unit 143, a wireless communication unit 144, a power supply circuit 145, and a battery 146.

The communication unit 141 is connected via a network such as a LAN, a WAN, or a leased line to the management apparatus 111 and configured to communicate with the management apparatus 111.

The processing unit 142 is, for example, implemented by a microcomputer and performs processing to link the management apparatus 111 and the electronic tags 113 according to a program installed in the storage unit 143.

The storage unit 143 is, for example, implemented by a rewritable non-volatile memory such as an EEPROM, a ROM, or a RAM and stores, for example, a communication control program and the electronic tag information 131 for a single communication session.

The wireless communication unit 144 wirelessly communicates with the electronic tags 113.

The power supply circuit 145 is connected to an outside AC power supply such as a commercial power supply. The power supply circuit 145 converts the AC voltage from the AC power supply into a DC voltage and supplies the DC voltage as the driving voltage to the communication unit 141, the processing unit 142, the storage unit 143, and the wireless communication unit 144.

The battery 146 is, for example, a rechargeable electrical storage device such as a NiCd battery, a lithium-ion battery, or an electric double layer capacitor. The battery 146 is charged by the DC voltage generated by the power supply circuit 145 and, if the AC power supply is cut off, supplies electricity to the communication unit 141, the processing unit 142, the storage unit 143, and the wireless communication unit 144 while a termination program is executed.

[Electronic Tag 113]

Figure 6:
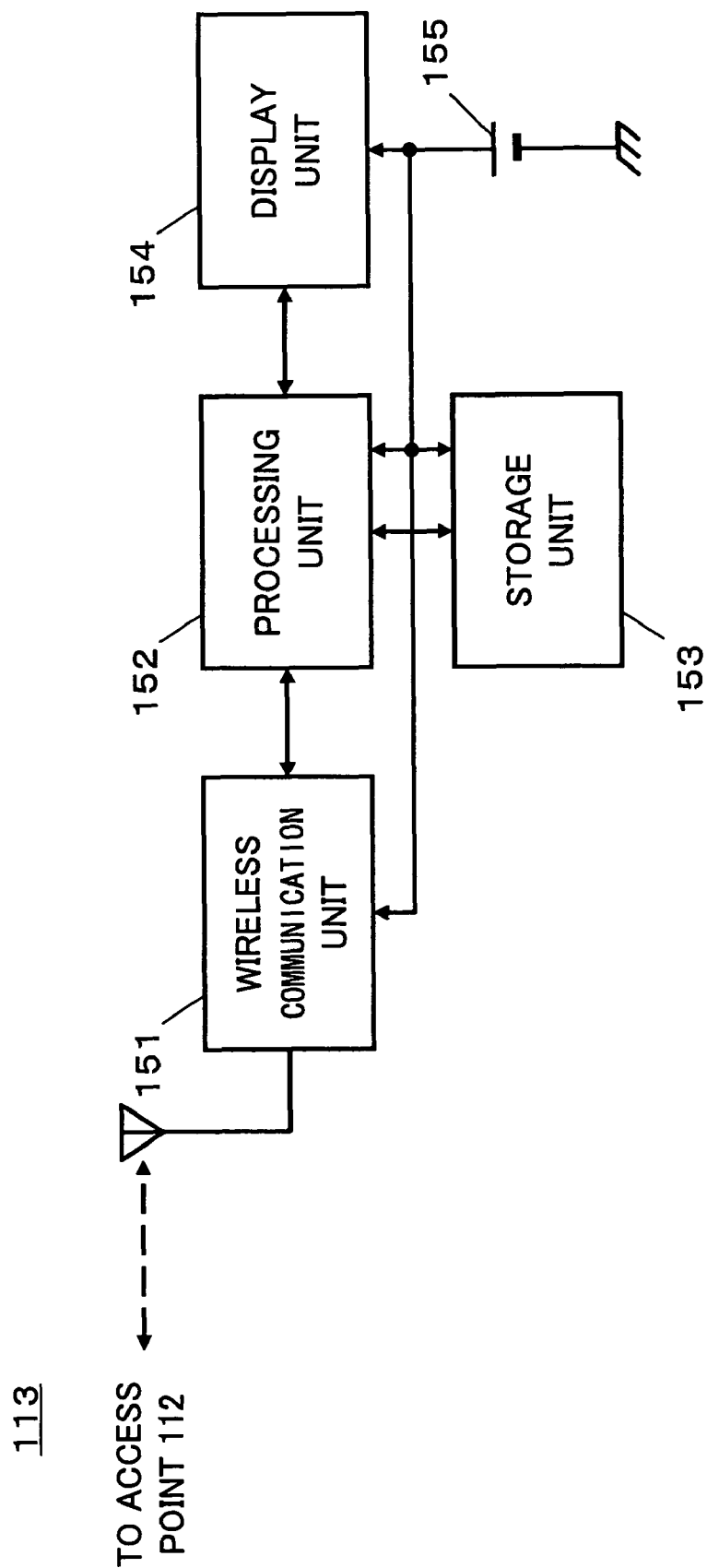
FIG. 6 is a block diagram illustrating an exemplary configuration of an electronic tag 113.

FIG. 6 is a block diagram illustrating an exemplary configuration of an electronic tag 113.

The electronic tag 113 includes a wireless communication unit 151, a processing unit 152, a storage unit 153, a display unit 154, and a battery 155.

The wireless communication unit 151 wirelessly communicates with the access point 112.

The processing unit 152 is, for example, implemented by a CPU and controls communication with the access point 153 according to a program installed in the storage unit 153.

The storage unit 153 is, for example, implemented by a rewritable non-volatile memory such as an EEPROM and stores, for example, a program to be executed by the processing unit 152, IDs, and a product code. Some of the IDs and the product code are prerecorded in the storage unit 153 and can be rewritten by the access point 112.

The display unit 154 is, for example, implemented by an LCD, an EL panel, or an electronic paper and displays, for example, a product name, a product code, and a price according to an instruction from the processing unit 152.

The battery 155 is a compact battery and supplies a driving voltage to the wireless communication unit 151, the processing unit 152, the storage unit 153, and the display unit 154.

[Workings of Electronic Tag System 100]

<Management Database Recreating Process>

An exemplary process of recreating a management database in the electronic tag system 100 is described below.

Figure 7:
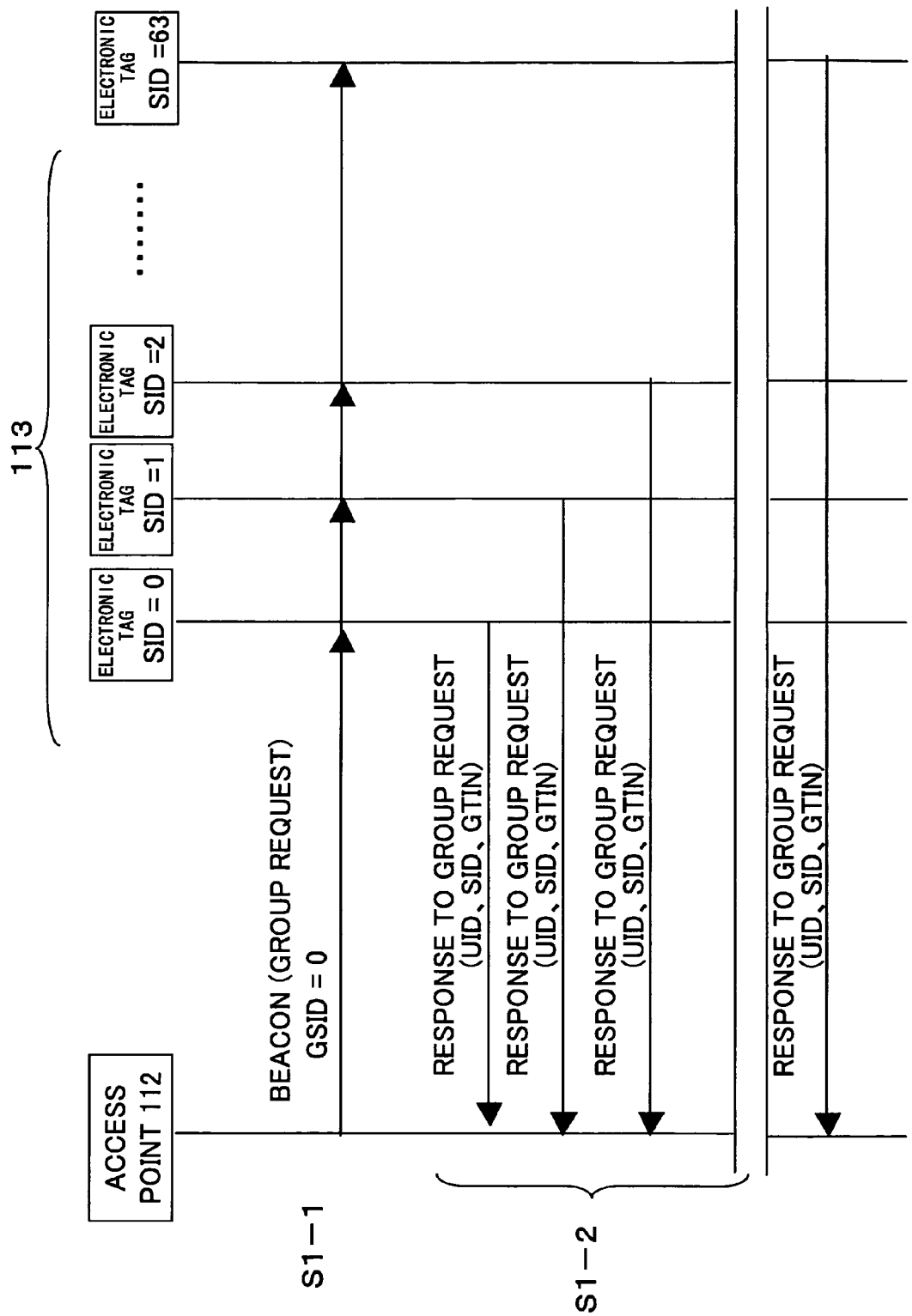
FIG. 7 is a drawing illustrating an exemplary process of recreating a management database in the electronic tag system 100.

FIG. 7 is a drawing illustrating the exemplary process of recreating a management database in the electronic tag system 100.

In step S1-1, the access point 112 broadcasts a group request (beacon) to the electronic tags 113.

When receiving the group request from the access point 112, each of the electronic tags 113 determines whether a group SID (GSID) in the group request matches the GSID in the electronic tag 113 itself. When the GSIDs match, the electronic tag 113 reads out electronic tag information in the storage 153 and sends the electronic tag information (response) to the access point 112. The electronic tag information in the storage 153 of the electronic tag 113 has substantially the same structure as that of the electronic tag information shown in FIG. 4.

The electronic tag 113 sends the response to the access point 112 in such a manner that the response does not collide with responses from other electronic tags 113 in the same group.

When the response is received from the electronic tag 113, the access point 112 registers the electronic tag information in the response in the management database 147.

Exemplary processes of recreating a management database on the parts of the access point 112, the electronic tag 113, and the management apparatus 111 are described below.

First, an exemplary process of recreating a management database on the part of the access point 112 is described.

Figure 8:
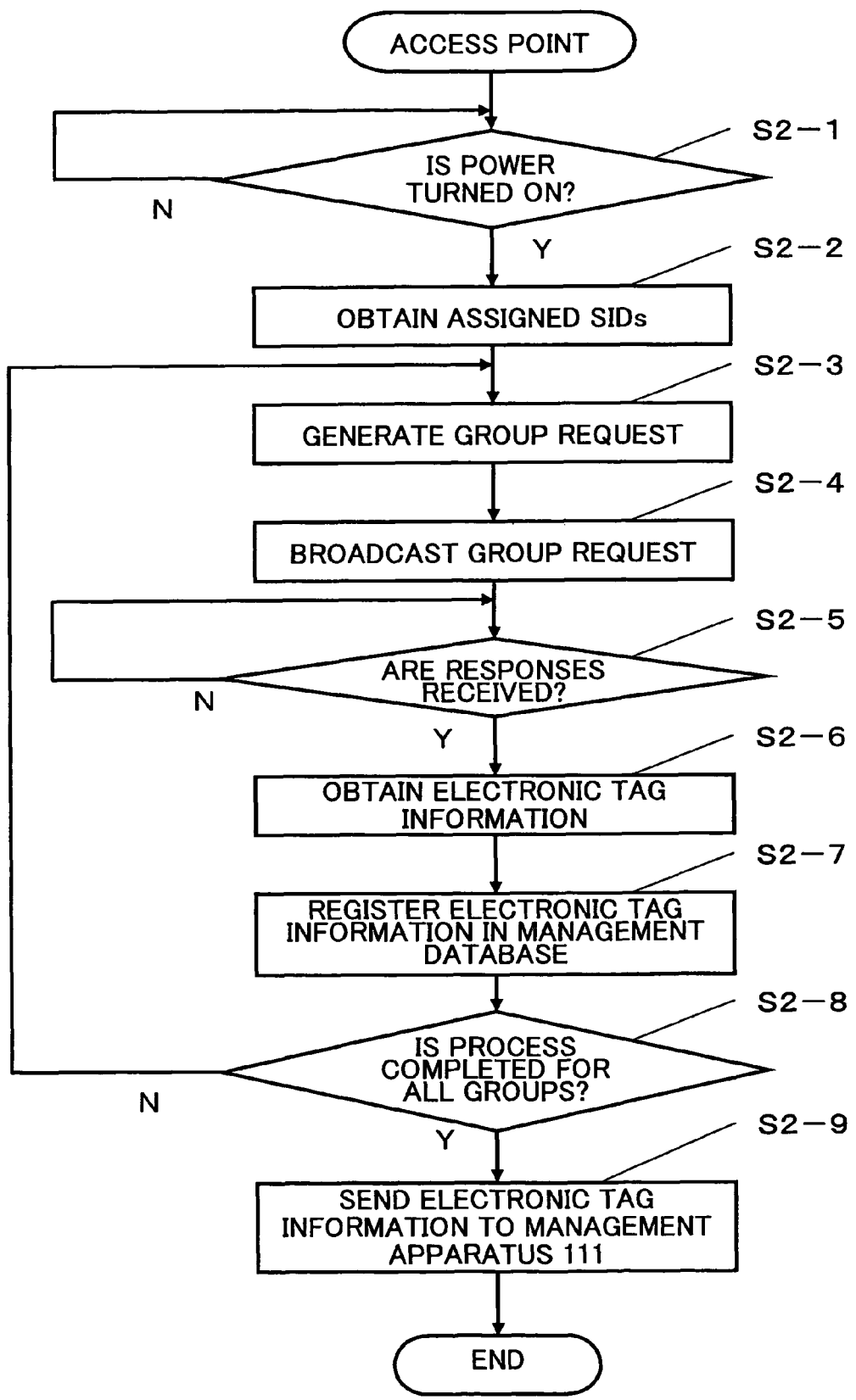
FIG. 8 is a flowchart showing an exemplary process of recreating a management database on the part of the access point 112.

FIG. 8 is a flowchart showing the exemplary process of recreating a management database on the part of the access point 112.

When the power is turned on in step S2-1, the processing unit 142 of the access point 112 obtains SIDs assigned to the access point 112 in step S2-2.

Figure 9:
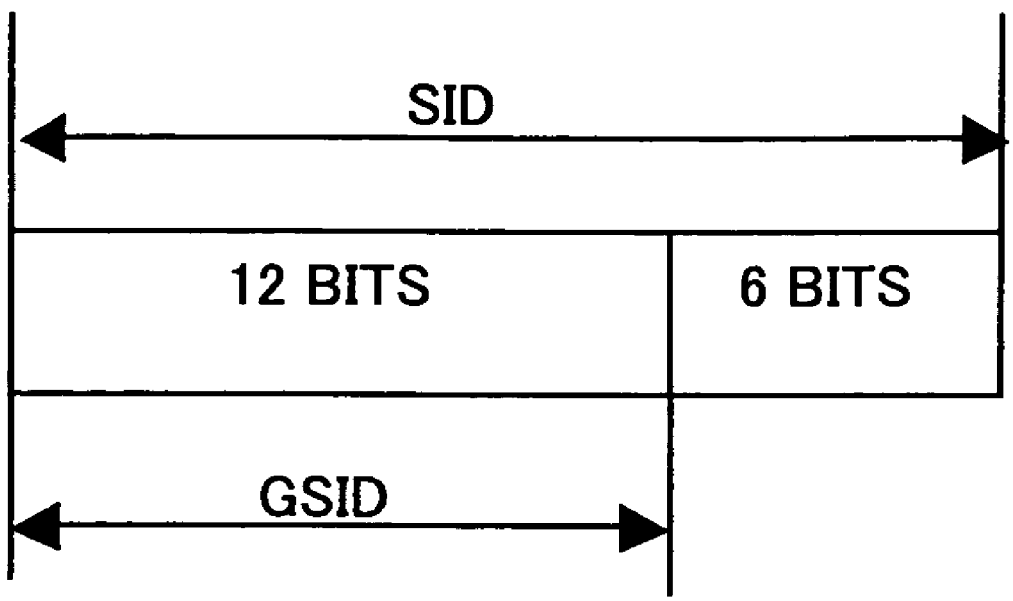
FIG. 9 is a drawing illustrating an exemplary structure of an SID.

FIG. 9 is a drawing illustrating an exemplary structure of an SID.

An SID has an 18 bit length. The 12 higher-order bits of an SID are used as a GSID for identifying a group.

In step S2-4, the processing unit 142 generates a group request including a GSID composed of the 12 higher-order bits of one of the SIDs obtained in step S2-3 and broadcasts the group request.

The processing unit 142 receives responses from the electronic tags 113 in the group corresponding to the GSID in step S2-5; obtains electronic tag information from the received responses in step S2-6; and registers the obtained electronic tag information in the management database 147 in step S2-7.

The processing unit 142 repeats steps S2-3 through S2-7 for all groups. Thus, the management database 147 is recreated based on the electronic tag information from the electronic tags 113 in all groups.

When steps S2-3 through S2-7 are completed for all groups corresponding to the obtained SIDs, in step S2-9, the processing unit 142 sends the electronic tag information in the management database 147 to the management apparatus 111 so that the management database 147 of the access point 112 and the management database 121 of the management apparatus 121 become consistent.

Next, an exemplary process of recreating a management database on the part of the electronic tag 113 is described.

Figure 10:
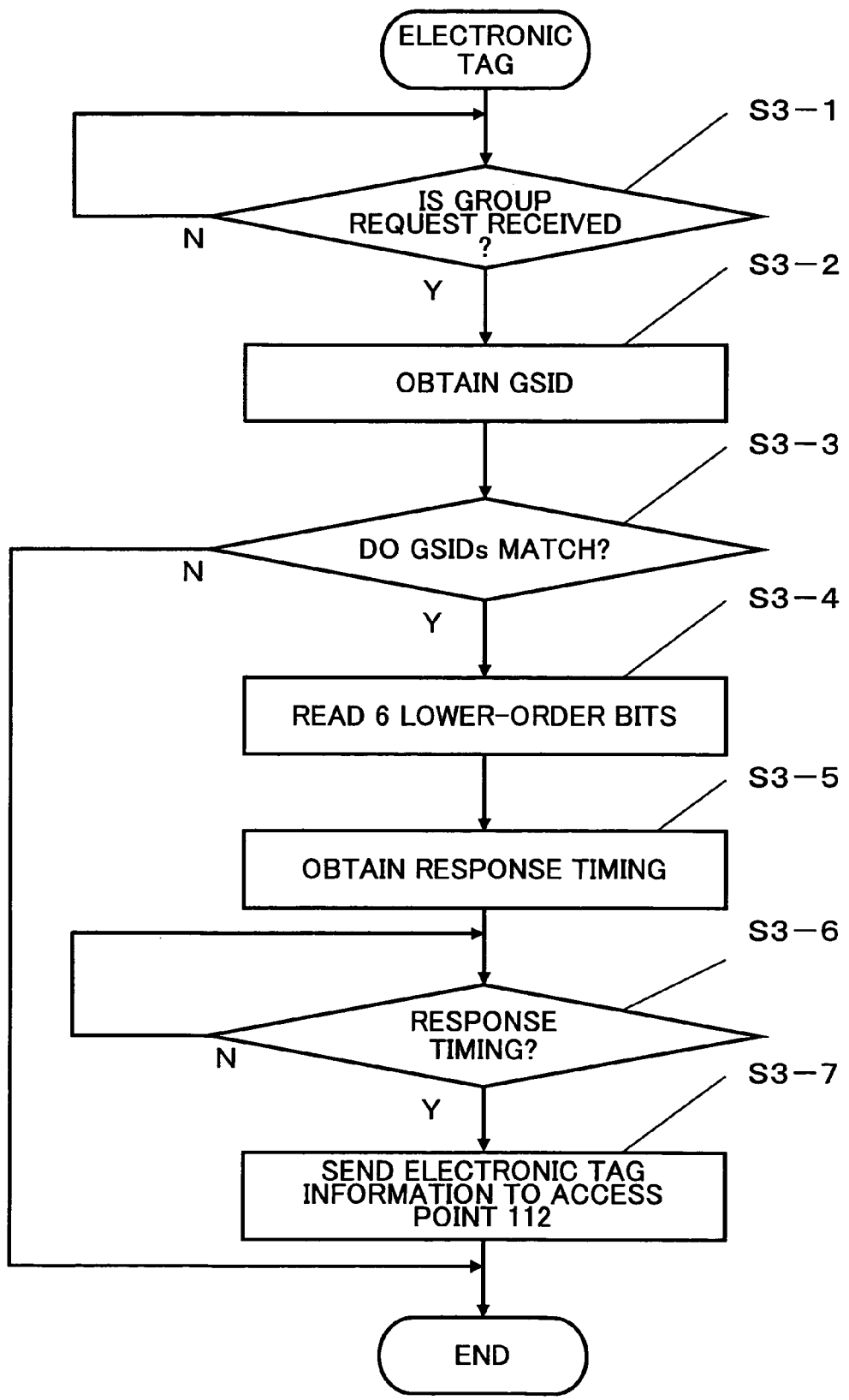
FIG. 10 is a flowchart showing an exemplary process of recreating a management database on the part of the electronic tag 113.

FIG. 10 is a flowchart showing the exemplary process of recreating a management database on the part of the electronic tag 113.

The processing unit 152 of the electronic tag 113 receives a group request in step S3-1; obtains the GSID in the group request in step S3-2; and compares the obtained GSID with the 12 higher-order bits (GSID) of its SID stored in the storage unit 153 in step S3-3.

When the GSIDs match in step S3-3, the processing unit 152 reads the 6 lower-order bits of the SID in step S3-4 and obtains a response timing based on the information in the 6 lower-order bits in step S3-5.

The processing unit 152 determines whether it is the response timing in step S3-6. When the response timing comes, the processing unit 152 sends the electronic tag information in the storage unit 153 to the access point 112.

On the other hand, when the GSIDs do not match in step S3-3, the processing unit 152 terminates the process.

Figure 11:
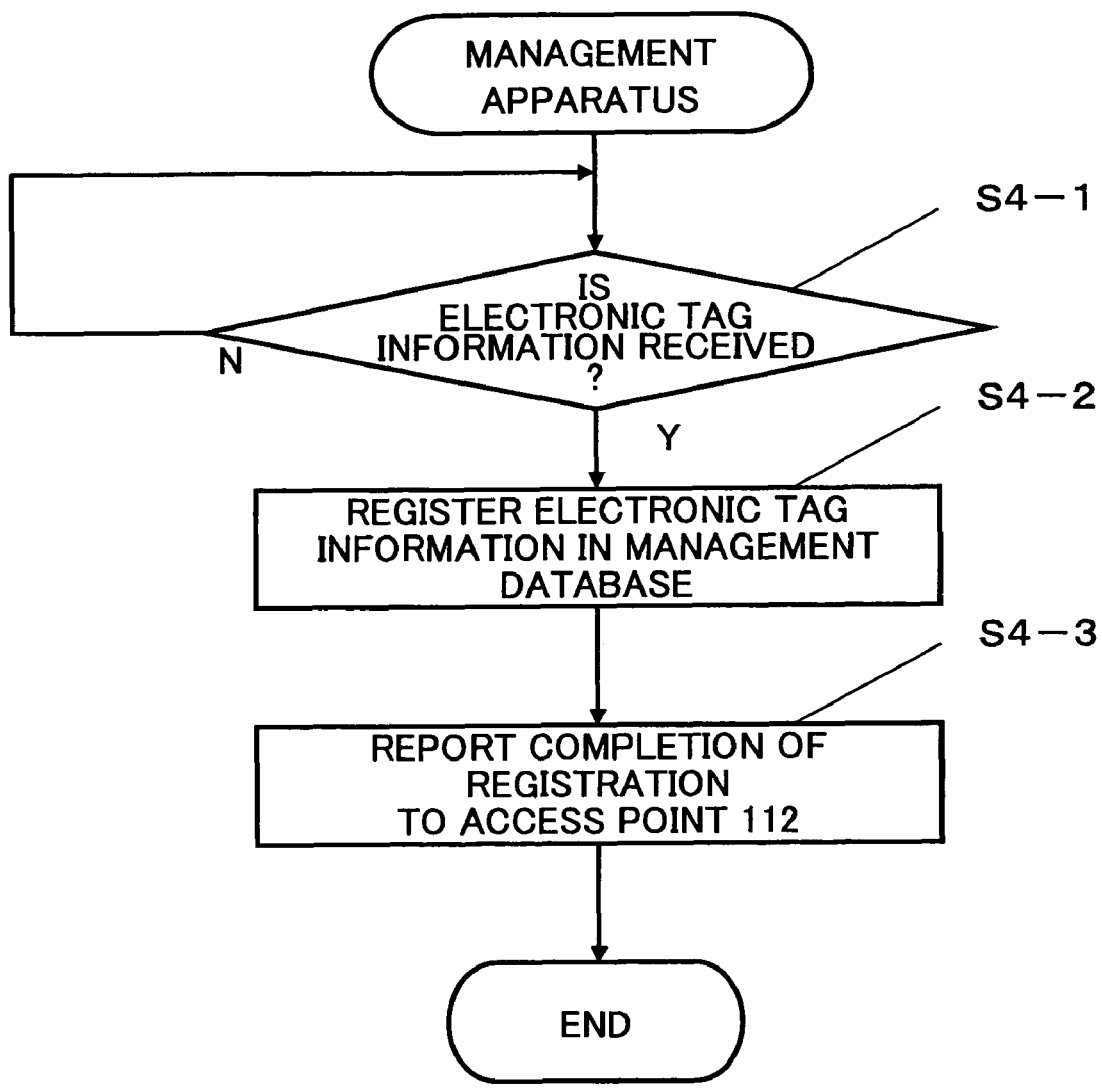
FIG. 11 is a flowchart showing an exemplary process of recreating a management database on the part of the management apparatus 111.

FIG. 11 is a flowchart showing an exemplary process of recreating a management database on the part of the management apparatus 111.

When receiving electronic tag information from the access point 112 in step S4-1, the processing unit 122 of the management apparatus 111 registers the electronic tag information in the management database 121 in step S4-2 and reports the completion of the registration to the access point 112 in step S4-3.

Figure 12:
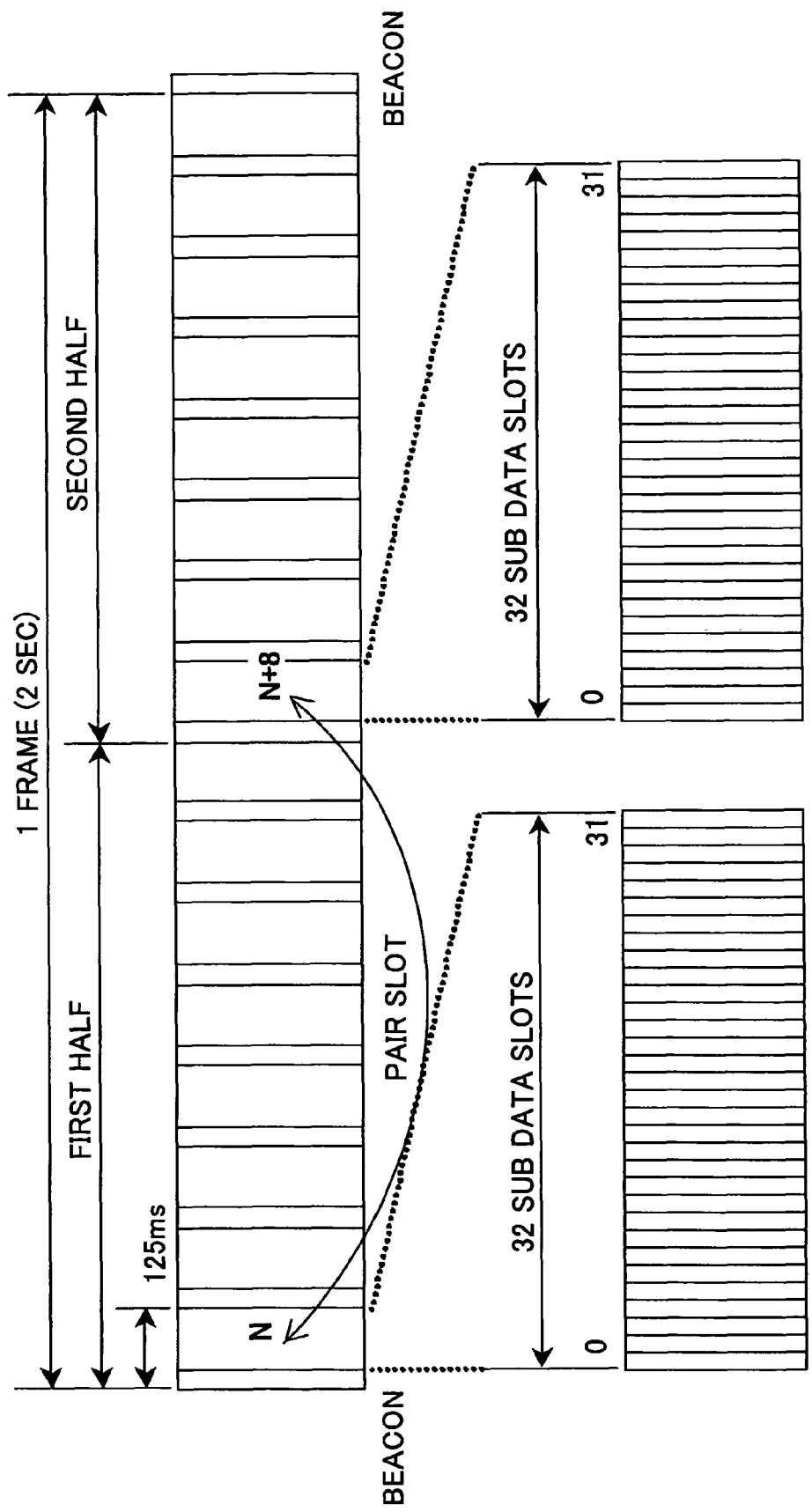
FIG. 12 is a drawing illustrating exemplary data slots used by the electronic tags 113 to send responses.

FIG. 12 is a drawing illustrating exemplary data slots used by the electronic tags 113 to send responses.

As shown in FIG. 9, the 12 higher-order bits of an 18 bit length SID is used as a GSID. For example, in the electronic tag system 100, when a group request is broadcast by one of the access points 112, responses are returned from up to 64 electronic tags 113 each having an SID the 12 higher-order bits of which match the GSID in the group request.

The sub data slot (response timing) for each of the 64 electronic tags is determined by the value of the 6 lower-order bits of the SID. Therefore, responses from the 64 electronic tags do not collide with each other.

In the electronic tag system 100, as shown in FIG. 12, 64 sub data slots (32 sub data slots in the first half and 32 sub data slots in the second half of a frame) are allocated for each group. When the value of the 6 lower-order bits of the SID of an electronic tag 113 is between 0 and 31, the electronic tag 113 responds at one of 0 through 31 sub data slots in the first half. When the value of the 6 lower-order bits of the SID of an electronic tag 113 is between 32 and 63, the electronic tag 113 responds at one of 0 through 31 sub data slots in the second half.

For example, the electronic tag system 100 may be configured so that up to 64 electronic tags 113 can respond within a certain period of time (response period: for example, 250 ms) without causing a collision.

The response period (250 ms) is divided into 64 sub data slots. When receiving a group request, each of the 64 electronic tags 113 responds at one of the 64 sub data slots that corresponds to the 6 lower-order bits of the SID.

In the above embodiment, since the 12 higher-order bits of an SID is used as a GSID, it is possible to form up to 4096 groups. To send 4096 group requests and receive responses, it may take approximately 1024 seconds (about 17 minutes).

The maximum number of the electronic tags 113 in the above embodiment is $2^{18}$. When the number of electronic tags used in a store is assumed to be between about 10,000 and 100,000, the time necessary to recreate a management database may be between about 39 and 390 seconds.

As described above, embodiments of the present invention make it possible to automatically recreate a management database of electronic tags, in other words, to provide a maintenance free management database.

An exemplary electronic tag system according to an embodiment of the present invention includes electronic tags and a communication apparatus that communicates with the electronic tags and includes management information to manage the electronic tags. In the exemplary electronic tag system, each of the electronic tags contains an ID a part of which represents one of group IDs identifying groups among the electronic tags and is configured to send a response when a request sent from the communication apparatus contains a corresponding one of the group IDs; and the communication apparatus is configured to send requests one by one each of which requests contains one of the group IDs, thereby to request the electronic tags group by group to send responses to the communication apparatus, and to recreate the management information based on the responses. Such an electronic tag system makes it possible to improve the efficiency of managing electronic tags.

The present invention is not limited to the specifically disclosed embodiments, and variations and modifications may be made without departing from the scope of the present invention. For example, the present invention may also be applied to wireless communication systems other than an electronic tag system as described in the above embodiments.

The present application is based on Japanese Priority Application No. 2006-038661, filed on Feb. 15, 2006, the entire contents of which are hereby incorporated herein by reference.

What is claimed is:

1. A system including electronic tags and a communication apparatus that communicates with the electronic tags,
    wherein each of the electronic tags includes
        a display unit and a storage unit containing an ID including a first part and a second part, the first part of the ID representing one of group IDs identifying groups among the electronic tags, the second part of the ID indicating a response timing, and
    is configured to send a response when a group request sent from the communication apparatus contains the one of the group IDs represented by the first part of the ID;
    wherein the communication apparatus includes a management database containing electronic tag information for managing the electronic tags and display information associated with the electronic tag information and to be displayed on the display units of the electronic tags, and is configured to obtain upon power-on the group IDs assigned to the communication apparatus and to send group requests one by one each of which group requests contains one of the obtained group IDs, thereby to request the electronic tags group by group to send responses to the communication apparatus for all groups, and to recreate the management database based on the responses by registering in the management database the obtained electronic tag information contained in the responses; and
    wherein each of the electronic tags in each one of the groups is configured to send the response at the response timing indicated by the second part of the ID so as not to cause a collision between the responses.

2. A communication apparatus for managing electronic tags each tag including a display unit and a storage unit containing an ID including a first part and a second part, the first part of the ID representing one of group IDs identifying groups among the electronic tags, the second part of the ID indicating a response timing, comprising:
    a communication unit configured to communicate with the electronic tags;
    a management database containing electronic tag information for managing the electronic tags and display information associated with the electronic tag information and to be displayed on the display units of the electronic tags; and
    a processing unit configured to obtain power-up on the group IDs assigned to the communication apparatus and to send group requests one by one each of which group requests contains one of the obtained group IDs corresponding to the first part of the ID, thereby to request the electronic tags group by group to send responses to the communication apparatus for all groups, and to recreate the management database based on the responses by registering in the management database the obtained electronic tag information contained in the responses,
    wherein each of the electronic tags in each one of the groups is configured to send the response at the response timing indicated by the second part of the ID so as not to cause a collision between responses.

3. An electronic tag, comprising:
    a communication unit configured to communicate with a communication apparatus;
    a storage unit containing an ID including a first part and a second part, the first part of the ID representing one of group IDs identifying groups among electronic tags, the second part of the ID indicating a response timing;
    a processing unit configured to send a response to the communication apparatus when a group ID in a request sent from the communication apparatus matches the group ID represented by the first part of the ID, so that based on the responses the communication apparatus can recreate a management database containing electronic tag information for managing the electronic tags and display information associated with the electronic tag information and to be displayed on the display units of the electronic tags, by registering in the management database the obtained electronic tag information contained in the responses; and
    a display unit configured to display information sent from the communication apparatus, wherein the processing unit is configured to send the response at the response timing indicated by the second part of the ID so that the response does not collide with the responses from other electronic tags having the same group ID.

* * * * *